(12) United States Patent
Yamada

(10) Patent No.: US 10,031,435 B2
(45) Date of Patent: Jul. 24, 2018

(54) COLOR IMAGE FORMATION WITH CONTROL FOR TONER AMOUNT LIMITING

(71) Applicant: CANON KABUSHIKI KAISHA, Tokyo (JP)

(72) Inventor: Michihiko Yamada, Tsukubamirai (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 5 days.

(21) Appl. No.: 15/268,170

(22) Filed: Sep. 16, 2016

(65) Prior Publication Data

US 2017/0102632 A1    Apr. 13, 2017

(30) Foreign Application Priority Data

Oct. 8, 2015  (JP) ................. 2015-200526

(51) Int. Cl.
| G03G 15/01 | (2006.01) |
| G06K 15/00 | (2006.01) |
| B41J 2/00 | (2006.01) |
| H04N 1/00 | (2006.01) |
| G06K 15/12 | (2006.01) |
| H04N 1/60 | (2006.01) |
| B41J 2/525 | (2006.01) |
| B41J 2/21 | (2006.01) |
| G03G 15/00 | (2006.01) |

(52) U.S. Cl.
CPC ........... *G03G 15/0121* (2013.01); *B41J 2/21* (2013.01); *B41J 2/525* (2013.01); *G03G 15/50* (2013.01); *G06K 15/129* (2013.01); *H04N 1/60* (2013.01); *H04N 1/6008* (2013.01)

(58) Field of Classification Search
CPC .. G03G 15/0121; G03G 15/50; G06K 15/129; H04N 1/4051; H04N 1/4053; H04N 1/407; H04N 1/60; H04N 1/6008; H04N 1/6027; H04N 1/6083; B41J 2/5056; B41J 2/525; B41J 2/21
USPC ........ 347/129, 131, 251, 254; 358/3.1, 3.22, 358/3.23
See application file for complete search history.

(56) References Cited

U.S. PATENT DOCUMENTS

| 8,705,127 B2 * | 4/2014 | Koyatsu ............. G03G 15/0126 358/1.1 |
| 9,104,147 B2 | 8/2015 | Nagai .................. G03G 15/205 |
| 9,407,793 B2 | 8/2016 | Yamada ............... H04N 1/6019 |

(Continued)

FOREIGN PATENT DOCUMENTS

| JP | 2004077807 A * | 3/2004 |
| JP | 2007049338 A * | 2/2007 |

(Continued)

*Primary Examiner* — Robert Beatty
(74) *Attorney, Agent, or Firm* — Fitzpatrick, Cella, Harper & Scinto

(57) ABSTRACT

An image forming apparatus according to the present invention is an electrophotographic image forming apparatus that forms an image onto a print medium based on input image data. The image forming apparatus includes a setting unit configured to set, based on component values of multiple colors acquired for each pixel of the image data, a limiting value on a toner amount to use in the image formation for each pixel, and an image forming unit configured to form an image onto the print medium with an amount of toner less than or equal to the set limiting value.

17 Claims, 10 Drawing Sheets

(56) References Cited

U.S. PATENT DOCUMENTS

| | | | | |
|---|---|---|---|---|
| 2005/0046882 A1* | 3/2005 | Kobayashi | ............... | H04N 1/60 |
| | | | | 358/1.9 |
| 2012/0147393 A1* | 6/2012 | Matsuzaki | ........... | G03G 15/556 |
| | | | | 358/1.9 |
| 2012/0147394 A1* | 6/2012 | Matsuzaki | ......... | G03G 15/0121 |
| | | | | 358/1.9 |

FOREIGN PATENT DOCUMENTS

| | | | | | |
|---|---|---|---|---|---|
| JP | 2013164476 A | * | 8/2013 | | |
| JP | 2014-092679 | | 5/2014 | | |
| JP | 2014142442 A | * | 8/2014 | ............... | H04N 1/54 |

\* cited by examiner

| COLOR-SPECIFIC THRESHOLD VALUE | C | 70% |
|---|---|---|
| | M | 70% |
| | Y | 70% |
| | K | 70% |
| COLOR COUNT THRESHOLD VALUE | | 2 |
| LIMITING VALUE 1 | | 200% |
| LIMITING VALUE 2 | | 210% |

FIG.4A

| COLOR-SPECIFIC RANGE | C | C>70% | 70%≧C>60% | 60%≧C |
|---|---|---|---|---|
| | M | M>70% | 70%≧M>60% | 60%≧M |
| | Y | Y>70% | 70%≧Y>60% | 60%≧Y |
| | K | K>70% | 70%≧K>60% | 60%≧K |
| COLOR COUNT THRESHOLD VALUE | | 2 | | |
| LIMITING VALUE | | 200% | 210% | 220% |

FIG.4B

COLOR IMAGE FORMATION WITH CONTROL FOR TONER AMOUNT LIMITING

BACKGROUND OF THE INVENTION

Field of the Invention

The present invention relates to an image forming apparatus, an image forming apparatus control method, an image processing apparatus, an image processing method and a storage medium.

Description of the Related Art

There is known an electrophotographic image forming apparatus that forms a toner image on a print medium, and thermally fixes the formed toner image to the print medium. Typically, such an image forming apparatus decides the amount of toner to deposit on the print medium (hereinafter designated the "toner amount") for each pixel of image data, based on image data that has undergone a color separation process (raster image data). For example, if the minimum value and the maximum value of the component value of a color in a certain pixel (hereinafter designated the "color component value") corresponds to the 8-bit values of 0 and 255, a color component value of "0" indicates a toner amount of 0%, while a color component value of "255" indicates a toner amount of 100%.

A multicolor image forming apparatus decides the toner amount based on the color component values for respective colors, such as CMYK (cyan, magenta, yellow, black). For this reason, if the color component values for a certain pixel are (C, M, Y, K)=(255, 255, 0, 0), for example, the toner amount for that pixel becomes 100%+100%+0%+0%=200%. In this way, a multicolor image forming apparatus tends to deposit a greater amount of toner on the print medium than a monochrome image forming apparatus.

If the amount of deposited toner becomes excessive, toner fixing failure may occur in some cases. For example, excess toner may melt during fixing and peel off from the print medium, or the print medium may wrap around the fixing roller. Image forming apparatuses that conduct toner amount control to prevent toner fixing failure are widely known. Such an image forming apparatus controls the reduction of the amount of toner to a limiting value on the toner amount to use for image formation. Furthermore, a technology that decides the limiting value according to a temperature setting for the fixing device which consumes a large amount of electric power, and controls the amount of toner to be less than or equal to the decided limiting value has also been proposed (Japanese Patent Laid-Open No. 2014-092679).

SUMMARY OF THE INVENTION

However, according to the toner amount control in the past, the limiting value is set invariably according to the performance of the printer engine or the set temperature of the fixing device. For this reason, depending on the combination of color component values for each of the CMYK colors, even amounts of toner that pose no risk of causing toner fixing failure still may be reduced in some cases.

The issue that the present invention attempts to address will be described specifically with reference to FIG. 1.

Typically, as the amount of toner amount for each of the CMYK colors increases, the area covered by the toner on the print medium also increases, and the dots for each of the CMYK colors tend to overlap. This is because techniques such as a systematic dither method are used as a halftone process. This is because a systematic dither method recreates halftones by arranging dots at certain intervals, and as the toner amount for each of the CMYK colors increases, the dots are arranged more densely.

The image A is an output example in which image data having a toner amount of (C, M, Y, K)=(90%, 90%, 20%, 10%) is output to a print medium by a printer engine. In the image A, the area over which toner is deposited and the area in which the dots for each of the CMYK colors overlap are large, and thus toner fixing failure occurs more readily. To prevent such toner fixing failure, the toner amount is limited to be less than or equal to an initially set limiting value (for example, 200%), for example.

The image B is an output example in which image data having a toner amount of (C, M, Y, K)=(70%, 70%, 40%, 30%) is output to a print medium by a printer engine. In the image B, the area over which toner is deposited and the area in which the dots for each of the CMYK colors overlap are small compared to the image A, and thus toner fixing failure occurs less readily. In this case, if the toner amount (210%) is reduced to be less than or equal to the initially set limiting value (200%), even toner that normally does not need to be reduced will become reduced.

In the field of image processing, it is known that deeper hues may be expressed with hues expressed using the four colors of CMYK toner than hues expressed with the toner of a single color (for example, black expressed with K toner alone). Additionally, it is known that the greater the amount of toner is used, the deeper the hues may be expressed.

For this reason, according to the toner amount control in the past, the range of hues that may be expressed becomes constricted as a result of reducing even amounts of toner that pose no risk of causing toner fixing failure, and images with richer hues cannot be formed.

An image forming apparatus according to the present invention is an electrophotographic image forming apparatus that forms an image onto a print medium based on input image data, comprising a setting unit configured to set based on component values of multiple colors acquired for each pixel of the image data, a limiting value on a toner amount to use in the image formation for each pixel, and an image forming unit configured to form an image onto the print medium with an amount of toner less than or equal to the limiting value set by the setting unit.

Further features of the present invention will become apparent from the following description of exemplary embodiments (with reference to the attached drawings).

BRIEF DESCRIPTION OF THE DRAWINGS

FIG. 4A is an example of a reference table indicating a relationship between threshold values and limiting values according to Embodiment 1;

FIG. 4B is an example of a reference table indicating a relationship between threshold values and limiting values according to another embodiment;

DESCRIPTION OF THE EMBODIMENTS

Hereinafter, embodiments for carrying out the present invention will be described with reference to the drawings. The structural elements described in the following embodiments are merely for the sake of example, and the scope of the present invention is not intended to be limited thereto.

Embodiment 1

First, Embodiment 1 of the present invention will be described with reference to FIGS. 2 to 9. The present invention is applicable to an electrophotographic image forming apparatus which may be monochrome or multi-color, such as a copier, a multi-function peripheral (hereinafter designated "MFP"), a laser printer, or a fax machine. Note that in the embodiment described hereinafter, an MFP equipped with functions such as a scan function, a print function, a copy function, and a transmission function will be described as an example of an image forming apparatus applying the present invention. In addition, an MFP capable of forming a multicolor image on a print medium using developer (toner) of multiple colors (the four colors of CMYK) will be described as an example.

<Hardware Configuration of Image Forming Apparatus>

Figure 2:
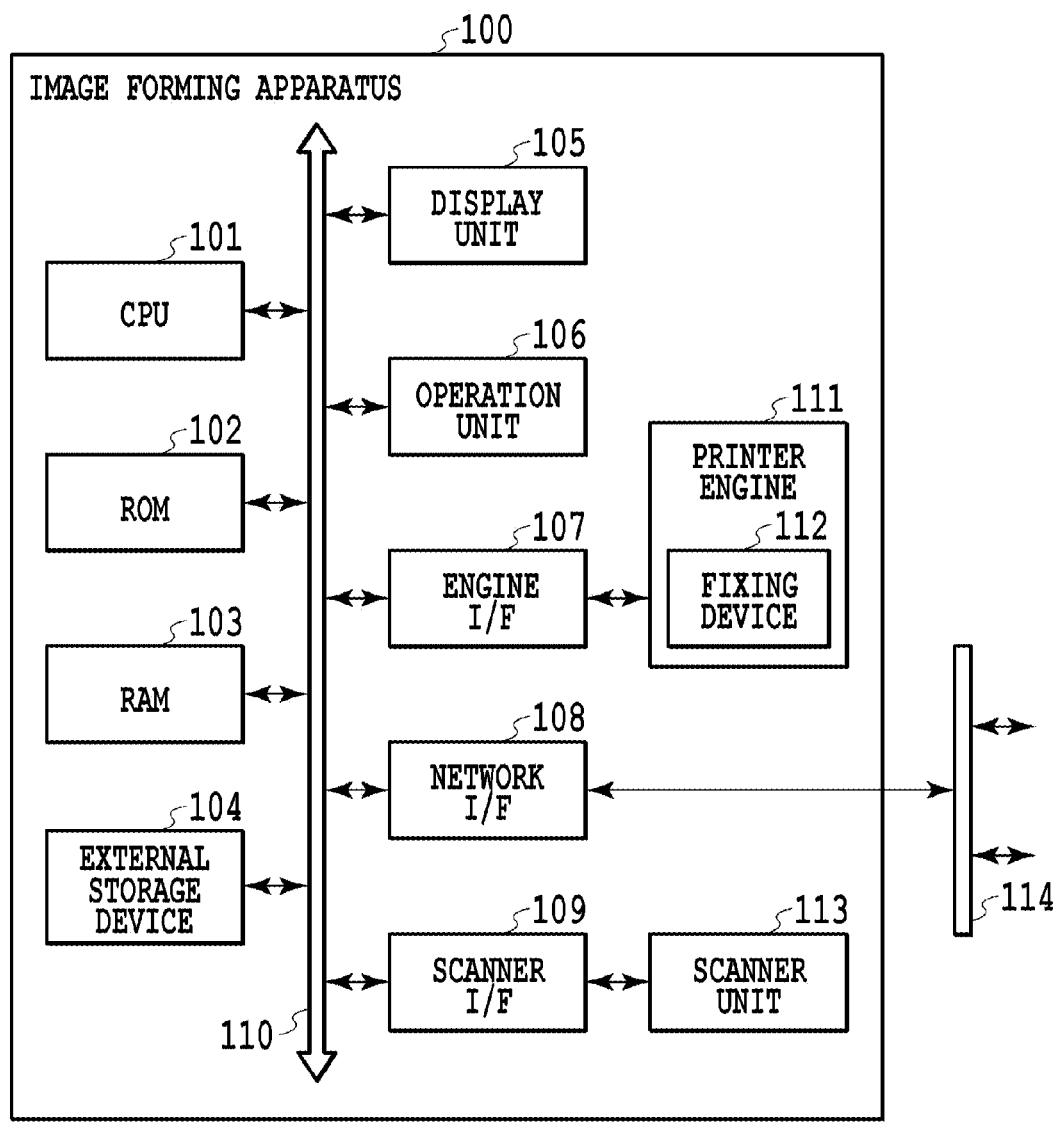
FIG. 2 is a block diagram illustrating a hardware configuration of an image forming apparatus according to Embodiment 1.

FIG. 2 is a block diagram illustrating a hardware configuration of an image forming apparatus 100 according the present embodiment. The image forming apparatus 100 is equipped with a CPU 101, ROM 102, RAM 103, an external storage device 104, a display unit 105, an operation unit 106, an engine interface (hereinafter designated "I/F") 107, a network I/F 108, and a scanner I/F 109. These devices are communicably interconnected through a system bus 110. Also, the image forming apparatus 100 additionally is equipped with a printer engine 111 and a scanner unit 113. The printer engine 111 and the scanner unit 113 are connected to the system bus 110 through the engine I/F 107 and the scanner I/F 109, respectively.

The CPU 101 controls the operation of the image forming apparatus 100 overall. The CPU 101 executes various processes to be discussed later by loading a program stored in the ROM 102 into the RAM 103 and executing the program. The ROM 102 is read-only memory that stores information such as a system boot program, a program for controlling the printer engine, character data, and character code information. The RAM 103 is volatile random access memory, and is used as a work area of the CPU 101, and also as a temporary storage area for various types of data. For example, the RAM 103 is used as a storage area for storing information such as font data additionally registered by downloading, and image files received from an external device. The external storage device 104 is made up of a hard disk, for example, onto which various data is spooled, and is used as a storage or work area for information such as programs, files, and image data.

The display unit 105 is made up of a liquid crystal display (hereinafter designated "LCD"), for example, and is used to display information such as the configuration settings of the image forming apparatus 100, the status of processes being executed, and error states. The operation unit 106 is equipped with an input device such as hardware keys and a touch panel provided on the display unit 105, and accepts input (instructions) performed by user operations. The operation unit 106 is used to perform actions such as changing or resetting the settings of the image forming apparatus 100, and is also used to set the operating mode (print mode) of the image forming apparatus 100 when executing image formation (printing).

The engine I/F 107 functions as an interface for controlling the printer engine 111 according to instructions from the CPU 101 when executing printing. Through the engine I/F 107, information such as commands is transmitted and received between the CPU 101 and the printer engine 111. The network I/F 108 functions as an interface for connecting the image forming apparatus 100 to a network 114. The network 114 may be a local area network (LAN), or a public switched telephone network (PSTN), for example. The printer engine 111, under control by the CPU 101, forms (prints) an image on a print medium, based on image data received from the system bus 110. The printer engine 111 is equipped with a fixing device 112 that uses heat to fix to a print medium a toner image transferred onto the print medium. The fixing device 112 is equipped with a heater for heating the print medium, and the temperature of the heater when fixing an image to the print medium (fixing temperature) is controlled by the CPU 101.

The scanner I/F 109 functions as an interface for controlling the scanner unit 113 according to instructions from the CPU 101 when scanning a document with the scanner unit 113. Through the scanner I/F 109, information such as commands is transmitted and received between the CPU 101 and the scanner unit 113. The scanner unit 113, under control by the CPU 101, scans an image of a document and generates image data, and transmits the image data to the RAM 103 or the external storage device 104 through the scanner I/F 109.

<Functional Configuration of Image Forming Apparatus>

Figure 3A:
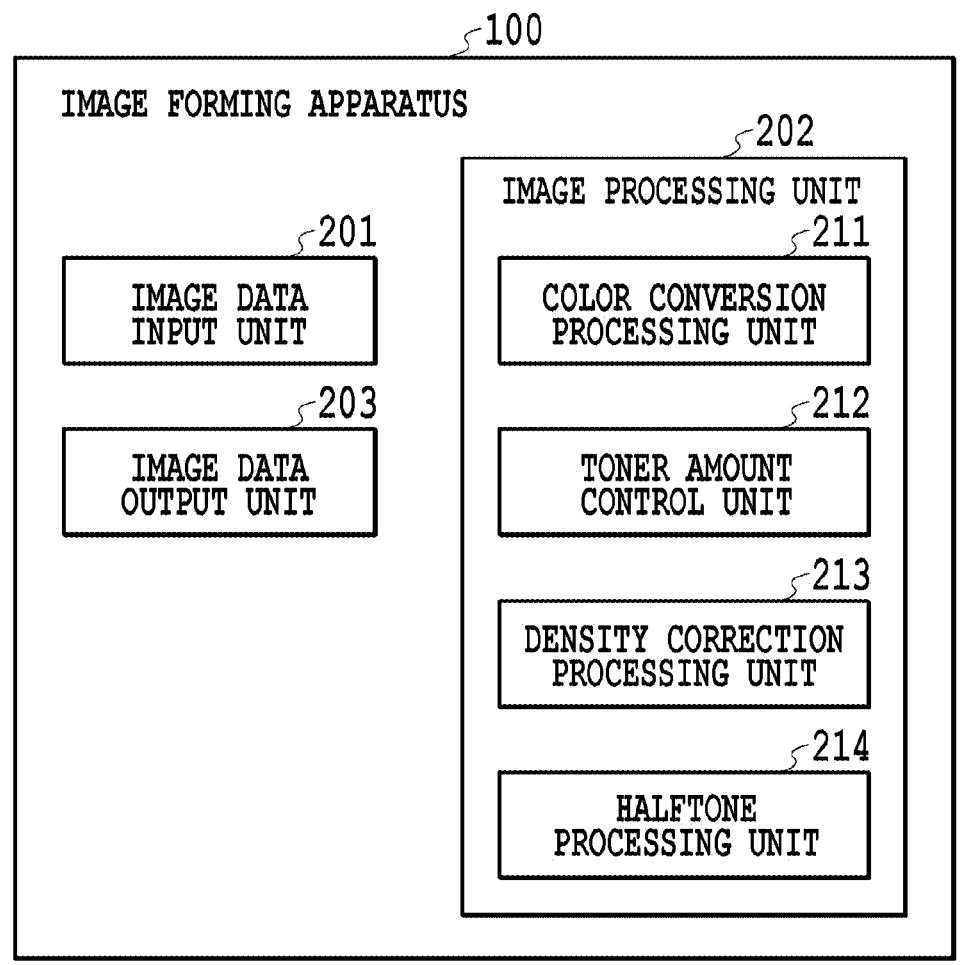
FIG. 3A is a block diagram illustrating a functional configuration of an image forming apparatus according to Embodiment 1.

FIG. 3A is a block diagram illustrating a functional configuration of the image forming apparatus 100. Functionally, the image forming apparatus 100 includes an image data input unit 201, an image processing unit 202, and an image data output unit 203. Each of these functional units is realized on the image forming apparatus 100 by having the CPU 101 load a program stored in the ROM 102 into the RAM 103 and execute the program.

The image data input unit 201 accepts the input of image data into the image forming apparatus 100. Image data may be input from an external device such as a PC through the network 114 and the network I/F 108, or image data generated by the scanner unit 113 may be input through the scanner I/F 109. The image data that is input may be a bitmap image, for example. The image data input unit 201 stores image data accepted as input in the RAM 103.

The image processing unit 202 executes image processing, such as a color conversion process, a density correction process, and a halftoning process, on the input image data. Consequently, the image processing unit 202 converts the input image data into image data (print data) corresponding to an image that the image data output unit 203 is able to output (print onto a print medium). In other words, the image processing unit 202 generates print data from the input image data. Note that although the present embodiment describes an example in which the image processing unit 202 is configured internally inside the image forming apparatus 100, an embodiment of the present invention is not limited to this configuration. For example, the image processing unit 202 may also be an information processing device (such as a PC) configured separately from the image forming apparatus 100. In this case, image data input into the information processing device (PC) is converted into print data by a printer driver, and the print data is supplied to the image forming apparatus 100 over the network 114.

The image data output unit 203 transmits image data (print data) generated by the image processing unit 202 to the printer engine 111 as a video signal through the engine I/F 107. Consequently, the image data output unit 203 controls the printer engine 111 to form an image onto a print medium based on the print data generated by the image processing unit 202. The printer engine 111 prints an image onto a print medium by executing the respective processes of exposure, development, transfer, and fixing. In the present embodiment, the image data output unit 203 and the printer engine 111 constituting an image forming unit that forms an image onto a print medium.

<Limiting Value Reference Table>

FIG. 4A illustrates an example of a reference table in which relationships between color-specific threshold values, a color count threshold value, and limiting values are associated together. The reference table is stored in the ROM 102 or the external storage device 104, and in a limiting value N setting process to be discussed later (see FIG. 7), the reference table is loaded into the RAM 103 as necessary and referenced by a toner amount control unit 212.

The color-specific threshold values are values compared against the color component values for each of the CMYK colors, and are set from 0% to 100% for each of the CMYK colors. Additionally, the color-specific threshold values are values decided in consideration of toner fixing failure. For example, even though the toner amount is the same 210%, toner fixing failure often occurs with the combination (C, M, Y)=(100%, 100%, 10%), whereas toner fixing failure often does not occur with the combination (C, M, Y)=(70%, 70%, 70%). In this case, the color-specific threshold values may be set to the toner amount combination (C, M, Y)=(70%, 70%, 70%). Ordinarily, the color-specific threshold values are the same value for each of the multiple colors, but may also be a different value for at least a subset of the multiple colors. For toner of the color K, which is output comparatively densely at the same toner amount compared to the other colors, the color-specific threshold value may be set to a small value, while the color-specific threshold values (CMY) corresponding to toner of the CMY colors may be set to large values. In addition, the units used for the color-specific threshold values are not limited to just percentage, and may also be numerical units from 0 to 255 in 8-bit.

The color count threshold value is a threshold value compared against the number of colors having a color component value greater than the color-specific threshold value from among the color component values for each of the CMYK colors. The color count threshold value may be set to a certain arbitrary number out of the number of toner colors, and is used in a comparative determination, such as whether the number of colors is equal to or greater than the predetermined number, or less than the predetermined number. In the present embodiment, "1" or "4" are not particularly meaningful as the color count threshold value, and thus the color count threshold value preferably is set to "2" or "3". Also, in the present embodiment, the color count threshold value is set in consideration of the magnitudes of the color-specific threshold values. For example, if the color-specific threshold values are set to 70% for each of the CMYK colors, the color count threshold value may be set to "2", whereas if the color-specific threshold values are set to 60% for each of the CMYK colors, the color count threshold value may be set to "3".

The limiting value indicates the total toner amount used in image formation. In the present embodiment, two limiting values, namely Limiting Value 1 (200%) and Limiting Value 2 (210%), are stored in a reference table (see FIG. 4A). In the limiting value N setting process to be discussed later (see FIG. 7), a limiting value setting unit 221 references this table, and sets the limiting value N based on the color component values for each of the CMYK colors.

For example, if there are two or more colors having color component values greater than 70% among the color component values for each of the CMYK colors, the output image will have larger areas of toner amount and larger areas in which the dots of each of the CMYK colors overlap, and toner fixing failure will occur more readily. In this case, Limiting Value 1 (200%) is set, and an image with an amount of toner less than or equal to Limiting Value 1 is formed. On the other hand, if there are less than two colors having color component values greater than 70% among the color component values for each of the CMYK colors, the output image will have smaller areas of toner amount and smaller areas in which the dots of each of the CMYK colors overlap, and toner fixing failure will occur less readily. In this case, Limiting Value 2 (210%) which is greater than Limiting Value 1 (200%) is referenced, and an image with an amount of toner less than or equal to Limiting Value 2 is formed.

FIG. 4B is a reference table in which relationships between color-specific threshold values, a color count threshold value, and limiting values are associated together. In the reference table in FIG. 4B, the color-specific threshold values include multiple threshold values (70%, 60%) set in consideration of toner fixing failure, and these multiple color-specific threshold values are categorized into ranges for each color. In the present embodiment, the color count threshold value is compared against the number of colors having a color component value in each of the color-specific ranges from among the color component values for each of the CMYK colors.

For example, if there are two or more colors having a color component value less than or equal to 70% and greater than 60% among the color component values for each of the CMYK colors, Limiting Value 2 (210%) which is greater than Limiting Value 1 is set as the limiting value. As above, in the reference table in FIG. 4B, limiting values with larger values are associated with to be referenced by fewer numbers of colors having color component values greater than the color-specific threshold values.

<Image Processing in Image Processing Unit>

As illustrated in FIG. 3A, the image processing unit 202 is equipped with a color conversion processing unit 211, a toner amount control unit 212, a density correction processing unit 213, and a halftone processing unit 214.

The color conversion processing unit 211 converts input image data into data suited to the image forming apparatus 100. For example, if the input image data is RGB data, and the image forming apparatus 100 is a multicolor printer using typical CMYK toner, the color conversion processing unit 211 converts from the input RGB data to CMYK data.

Note that if the input image data is CMYK data, the color conversion processing unit 211 may also not execute a color conversion process on the input image data.

The toner amount control unit 212 adjusts the toner amount for each pixel in the image data converted by the color conversion processing unit 211 (CMYK data), and generates image data corresponding to the adjusted toner amount (C'M'Y'K' data).

Figure 3B:
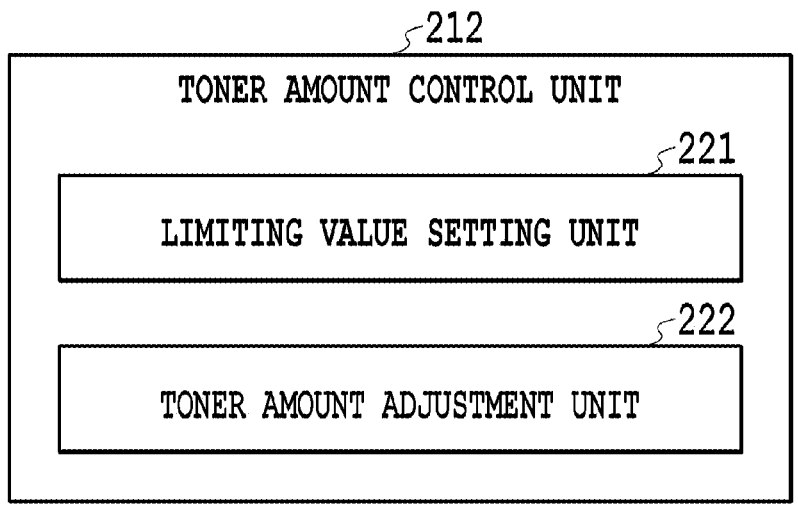
FIG. 3B is a block diagram illustrating a functional configuration of a toner amount control unit according to Embodiment 1.

FIG. 3B is a block diagram illustrating a functional configuration of the toner amount control unit 212. Functionally, the toner amount control unit 212 includes a limiting value setting unit 221 and a toner amount adjustment unit 222. Each of these functional units is realized on the image forming apparatus 100 by having the CPU 101 load a program stored in the ROM 102 into the RAM 103 and execute the program. The functions realized by the limiting value setting unit 221 and the toner amount adjustment unit 222 will be described in detail with reference to the flowcharts in FIG. 6 and FIG. 7, respectively.

Figure 5:
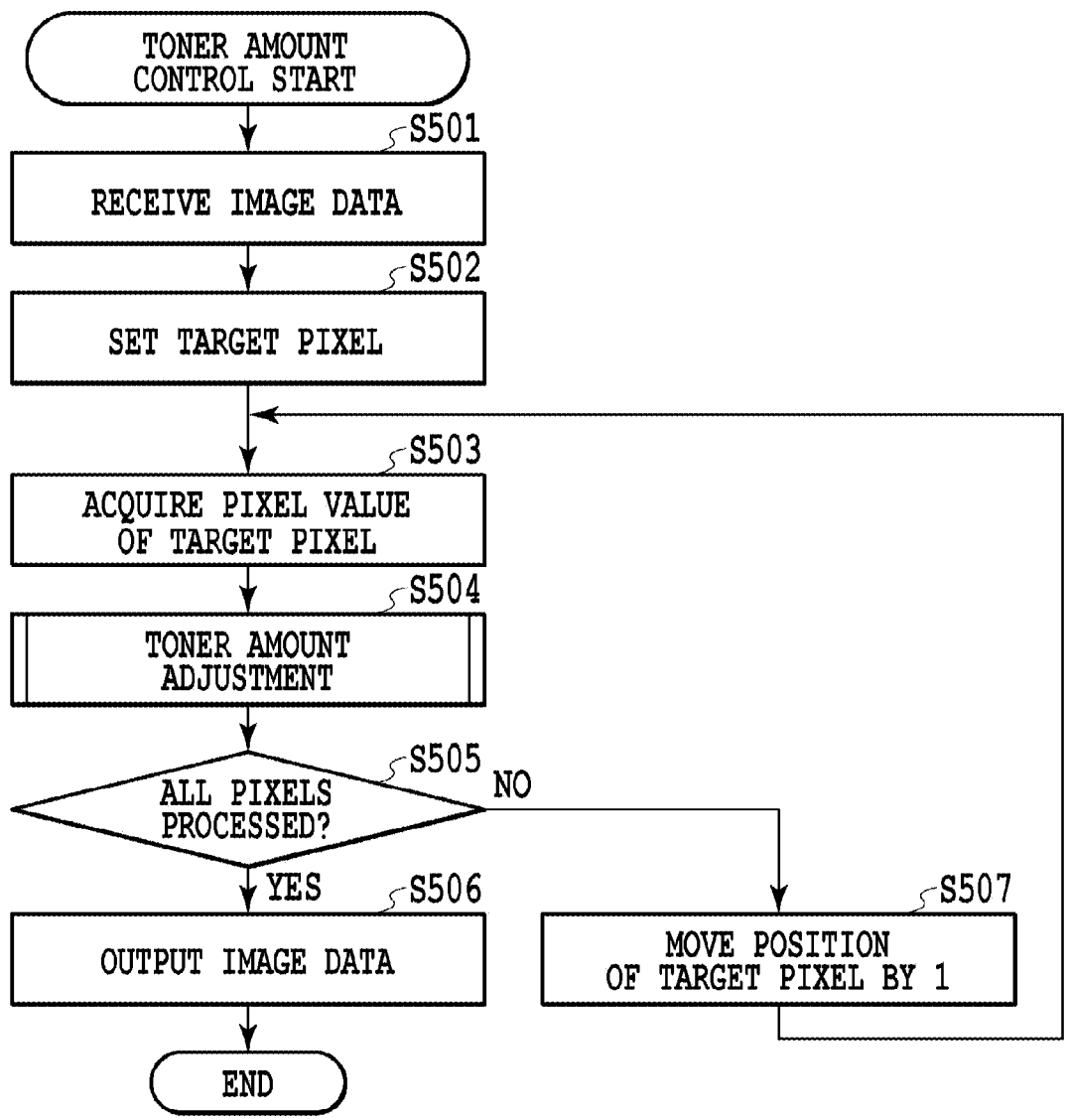
FIG. 5 is a flowchart illustrating a toner amount control procedure according to Embodiment 1.
Figure 6:
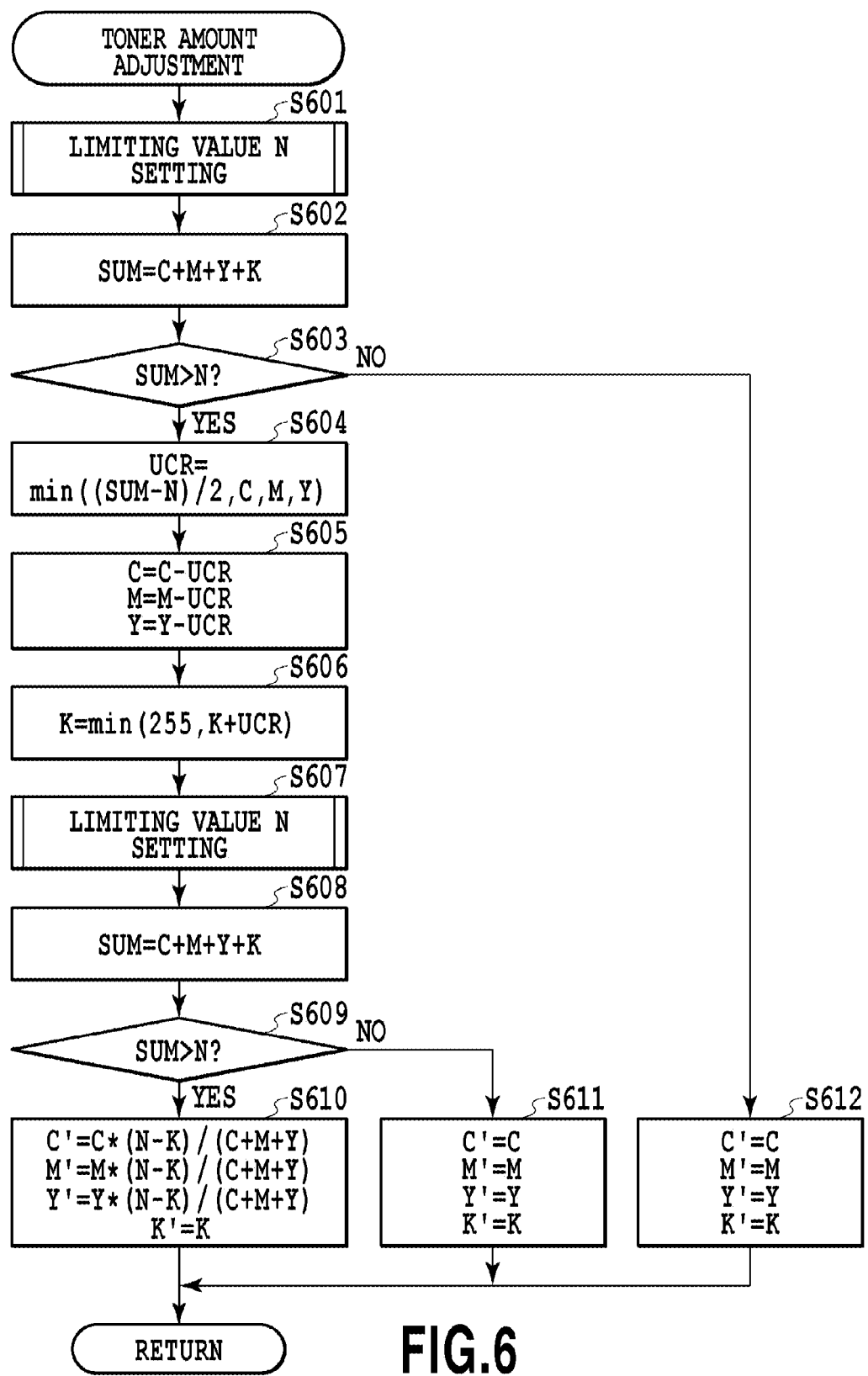
FIG. 6 is a flowchart illustrating a toner amount adjustment procedure according to Embodiment 1.
Figure 7:
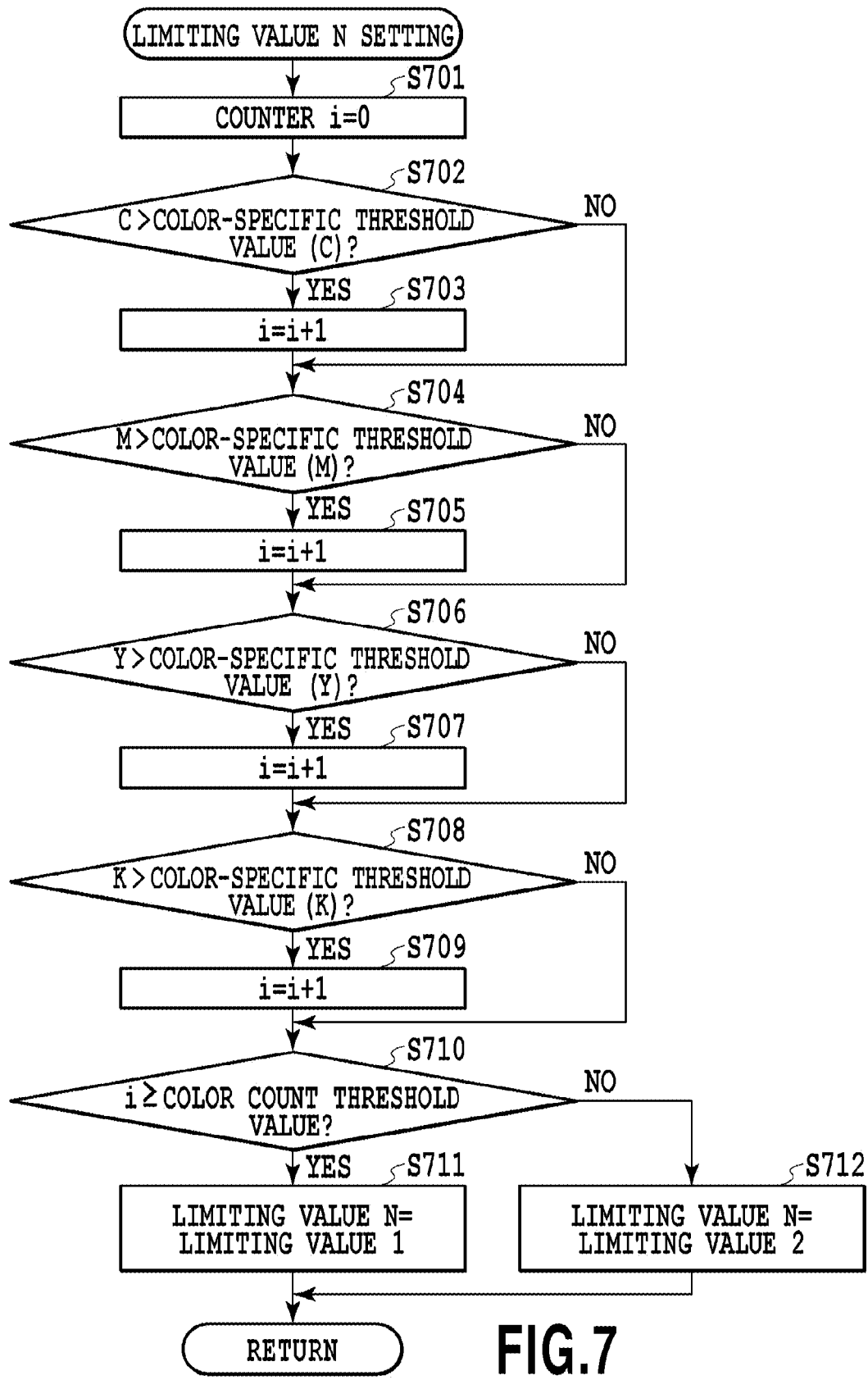
FIG. 7 is a flowchart illustrating a limiting value setting procedure according to Embodiment 1.

FIGS. 5 to 7 are flowcharts indicating a toner amount control procedure according to the present embodiment. The processes in each step of the flowcharts in FIGS. 5 to 7 are realized on the image forming apparatus 100 by having the CPU 101 load a program stored in the ROM 102 into the RAM 103 and execute the program.

In S501, the toner amount control unit 212 receives image data converted by the color conversion processing unit 211 (CMYK data).

In S502, the toner amount control unit 212 sets the position of the target pixel to the first pixel in the image data received in S501.

In S503, the toner amount control unit 212 acquires the pixel value of the target pixel.

In S504, the toner amount adjustment unit 222 adjusts the toner amount in the target pixel based on the pixel value of the target pixel. The procedure for adjusting the toner amount (S504) will now be described in detail with reference to the flowchart in FIG. 6.

In S601, the limiting value setting unit 221 conducts the limiting value N setting process. The procedure for changing the limiting value N (S601) will now be described in detail with reference to the flowchart in FIG. 7. Note that herein, it is supposed that the limiting value N is initially set to Limiting Value 1 (200%) at the start of the flowchart in S601.

In S701, the limiting value setting unit 221 initializes a counter i (i=0).

In S702, the limiting value setting unit 221 references the table in FIG. 4A, and determines whether the color component value of C in the target pixel is greater than the color-specific threshold value (C). In the present embodiment, a color-specific threshold value (C) of 70% is given as an example. The limiting value setting unit 221 is able to make the determination in S702 by comparing the 8-bit color component value of C to 178, which corresponds to 70% of 255. If the color component value of C in the target pixel is greater than the color-specific threshold value (C) (S702: Yes), in S703, the limiting value setting unit 221 increments the counter i (i=i+1). On the other hand, if the color component value of C in the target pixel is less than or equal to the color-specific threshold value (C) (S702: No), S703 is skipped, and the flow proceeds to S704.

In S704, the limiting value setting unit 221 references the table in FIG. 4A, and determines whether the color component value of M in the target pixel is greater than the color-specific threshold value (M). In the present embodiment, a color-specific threshold value (M) of 70% is given as an example. The limiting value setting unit 221 is able to make the determination in S704 by comparing the 8-bit color component value of M to 178, which corresponds to 70% of 255. If the color component value of M in the target pixel is greater than the color-specific threshold value (M) (S704: Yes), in S705, the limiting value setting unit 221 increments the counter i (i=i+1). On the other hand, if the color component value of M in the target pixel is less than or equal to the color-specific threshold value (M) (S704: No), S705 is skipped, and the flow proceeds to S706.

In S706, the limiting value setting unit 221 references the table in FIG. 4A, and determines whether the color component value of Y in the target pixel is greater than the color-specific threshold value (Y). In the present embodiment, a color-specific threshold value (Y) of 70% is given as an example. The limiting value setting unit 221 is able to make the determination in S706 by comparing the 8-bit color component value of Y to 178, which corresponds to 70% of 255. If the color component value of Y in the target pixel is greater than the color-specific threshold value (Y) (S706: Yes), in S707, the limiting value setting unit 221 increments the counter i (i=i+1). On the other hand, if the color component value of Y in the target pixel is less than or equal to the color-specific threshold value (Y) (S706: No), S707 is skipped, and the flow proceeds to S708.

In S708, the limiting value setting unit 221 references the table in FIG. 4A, and determines whether the K color component value in the target pixel is greater than the color-specific threshold value (K). In the present embodiment, a color-specific threshold value (K) of 70% is given as an example. The limiting value setting unit 221 is able to make the determination in S708 by comparing the 8-bit K color component value to 178, which corresponds to 70% of 255. If the K color component value in the target pixel is greater than the color-specific threshold value (K) (S708: Yes), in S709, the limiting value setting unit 221 increments the counter i (i=i+1). On the other hand, if the K color component value in the target pixel is less than or equal to the color-specific threshold value (K) (S708: No), S709 is skipped, and the flow proceeds to S710.

In S710, the limiting value setting unit 221 determines whether or not the value of the counter i is equal to or greater than the color count threshold value. If the value of the counter i is equal to or greater than the color count threshold value (S710: Yes), in S711, the limiting value setting unit 221 sets the limiting value N to Limiting Value 1. In the present embodiment, a color count threshold value of "2" and a Limiting Value 1 of "200%" are given as an example. For this reason, the limiting value setting unit 221 of the present embodiment sets the limiting value N to 200% if at least two color component values from among the color component values for each of the CMYK colors are greater than the color-specific threshold values.

On the other hand, if the value of the counter i is less than the color count threshold value (S710: No), in S712, the limiting value setting unit 221 sets the limiting value N to Limiting Value 2. In the present embodiment, a color count threshold value of "2" and a Limiting Value 2 of "210%" are given as an example. For this reason, the limiting value setting unit 221 of the present embodiment sets the limiting value N to Limiting Value 2 (210%), which is greater than Limiting Value 1, if fewer than two color component values from among the color component values for each of the CMYK colors are greater than the color-specific threshold values. In this way, the limiting value setting unit 221 is able to set the limiting value on the toner amount within a range in which toner fixing failure does not occur, according to the combination of color component values for each of the CMYK colors.

Additionally, in another embodiment, the limiting value setting unit 221 may reference the table in FIG. 4B and conduct the limiting value N setting process. In this case, instead of the processes from S702 to S709 in Embodiment 1, a limiting value may be set according to the other embodiment by counting the number of colors having a color component value in the color-specific range that is less than or equal to a first threshold value (70%, for example) and greater than a second threshold value (60%, for example).

Furthermore, in another embodiment, the limiting value setting unit 221 may change the limiting value N from the predetermined initially set value of Limiting Value 1 (200%) to Limiting Value 2 (210%) only if the value of the counter i is less than the color count threshold value (S710: No). Such a configuration exhibits an advantageous effect of reducing the processing overhead for toner amount control.

Returning again to FIG. 6, in S602, the toner amount adjustment unit 222 computes the total of the color component values for each of the CMYK colors based on the pixel value of the target value, and sets this value as SUM (SUM=C+M+Y+K).

In S603, the toner amount adjustment unit 222 determines whether the value SUM computed in S601 is greater than the limiting value N set in S602 (SUM>N?). If the value SUM is greater than the limiting value N (S603: Yes), the flow proceeds to S604, whereas if the value SUM is less than or equal to the limiting value N (S603: No), the flow proceeds to S612.

The process from S604 to S606 is a under color removal (UCR) process. In S604, the toner amount adjustment unit 222 takes the minimum value from among the value obtained by halving the difference value of subtracting the limiting value N from the value SUM ((SUM−N)/2), and the color component values for each of the CMY colors, and sets the minimum value as the value UCR. Note that the arithmetic operation of computing a value divided by 2 may be realized with a 1-bit right shift.

In S605, the toner amount adjustment unit 222 sets the values obtained by subtracting the value UCR computed in S604 from the color component values for each of the CMY colors as respective UCR-processed color component values for each of the CMY colors (C=C−UCR, M=M−UCR, Y=Y−UCR).

In S606, the toner amount adjustment unit 222 takes the minimum value from between an upper limit value that the K color component value may take (in the present embodiment, this corresponds to 255) and the value obtained by adding the value UCR computed in S604 to the K color component value, and sets the minimum value as the UCR-processed K color component value. Note that the color component values for each of the CMYK colors acquired in S503 are overwritten by the color component values for each of the CMYK colors computed from S605 to S606.

In S607, the limiting value setting unit 221 conducts a limiting value N re-setting process. At this point, the limiting value setting unit 221 conducts the limiting value N setting process based on the UCR-processed color component values for each of the CMYK colors computed in the processes from S604 to S606. Since the procedure for changing in the limiting value N in S607 is the same as the procedure in S601, further description will be omitted. Note that the limiting value N set in S601 is overwritten by the limiting value N of S607.

In S608, the limiting value setting unit 221 computes the total of the color component values for each of the CMYK colors based on the color component values for each of the CMYK colors computed from S605 to S606, and sets this value as SUM (SUM=C+M+Y+K). Note that the value SUM computed in S602 is overwritten by the value SUM computed in S608.

In S609, the limiting value setting unit 221 determines whether the value SUM computed in S608 is greater than the limiting value N set in S607 (SUM>N?). If the value SUM is greater than the limiting value N (S609: Yes), the flow proceeds to S610, whereas if the value SUM is less than or equal to the limiting value N (S609: No), the flow proceeds to S611.

The process in S610 is a CMY uniform reduction process that lowers the color component values for each of the CMY colors by the same ratio. In S610, the limiting value setting unit 221 proportionally divides the value (N−K) obtained by subtracting the K color component value from the limiting value N according to the proportions of the color component values for each of the CMY colors. The proportionally divided color component values for each of the CMY colors become the output color component values for each of the CMY colors (C'=C, M'=M, Y'=Y). For the K color component value, the K color component value computed by the UCR process (S604 to S606) directly becomes the K output color component value (K'=K).

On the other hand, in S611, the limiting value setting unit 221 sets the color component values for each of the CMYK colors computed by the UCR process (S604 to S606) directly as the CMYK output color component values (C'=C, M'=M, Y'=Y, K'=K). Also, in S612, the limiting value setting unit 221 sets the color component values for each of the CMYK colors acquired in S503 directly as the CMYK output color component values (C'=C, M'=M, Y'=Y, K'=K).

Returning again to FIG. 5, in S505, the toner amount control unit 212 determines whether or not the process from S503 to S504 has finished for all pixels in the image data received in S501.

If it is determined that the process has finished for all pixels (S505: Yes), the toner amount control unit 212 outputs image data including the CMYK output color component values (C'M'Y'K' data) to the density correction processing unit 213 (S506), and the flowchart ends.

If it is determined that the process has not finished for all pixels (S505: No), the toner amount control unit 212 moves the position of the target pixel by one in the main scanning direction of the printer engine 111 (S507), and proceeds to S503.

FIG. 3A will be referenced again to continue the description of the image processing unit 202. The density correction processing unit 213 conducts a correction process of correcting the image data output by the toner amount control unit 212 (C'M'Y'K' data) to match the unique density characteristics of the printer engine 111. The specific processing method may be, for example, a method that uses a density correction table associating an input density level and an output density level or a method that performs arithmetic operations using a function on the output color component values for each of the CMYK colors.

The halftone processing unit 214 performs a halftoning process on the density-corrected image data by the density correction processing unit 213. In many cases, the printer engine 111 supports only the output of a low number of tones, such as 2, 4, or 16 tones ordinarily. For this reason, the halftone processing unit 214 conducts a halftoning process that enables consistent halftone expression even with the output of a small number of tones. The specific processing method may be, for example, a known halftone processing method such as a density pattern method, a systematic dither method, or an error diffusion method. After that, the image data output section 203 controls the printer engine 111 to form an image onto a print medium based on the print data generated by the image processing unit 202, as discussed earlier. The printer engine 111 prints an image onto a print medium by executing the respective processes of exposure, development, transfer, and fixing.

Also, the above describes an embodiment in which the control for adjusting the toner amount is realized by a UCR process (S604 to S606) and a CMY uniform reduction process (S610). However, in another embodiment, the control for adjusting the toner amount is not limited to a UCR process and a CMY uniform reduction process, and may also be realized by a process that uniformly reduces the color component values for each of the CMYK colors.

Figure 1:
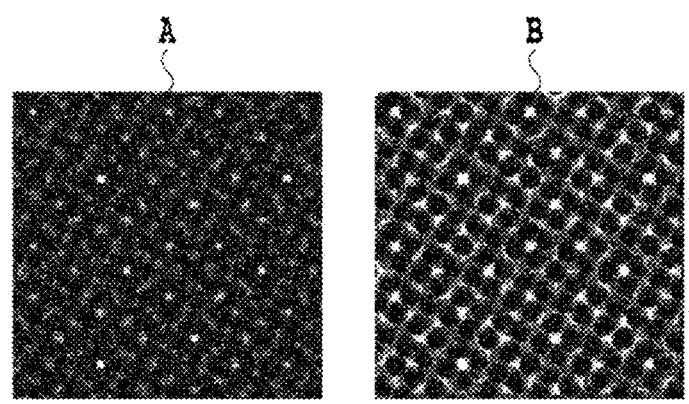
FIG. 1 is a diagram illustrating an example of an image output by an image forming apparatus.
Figure 8:
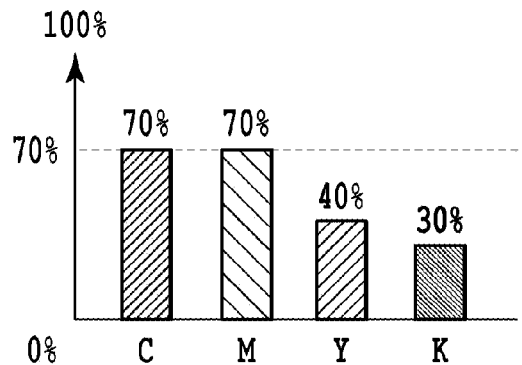
FIG. 8 is a diagram illustrating advantageous effects of toner amount control according to Embodiment 1.
Figure 8:
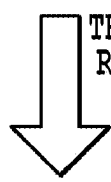
Figure 8:
Figure 8:
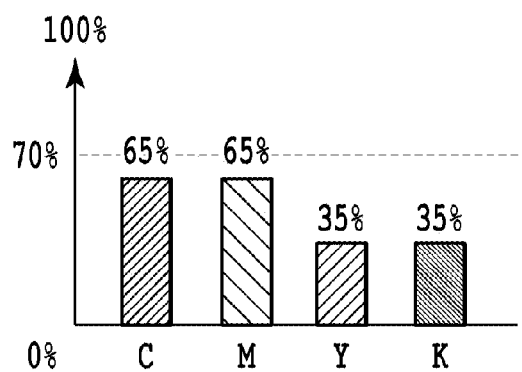
Figure 8:
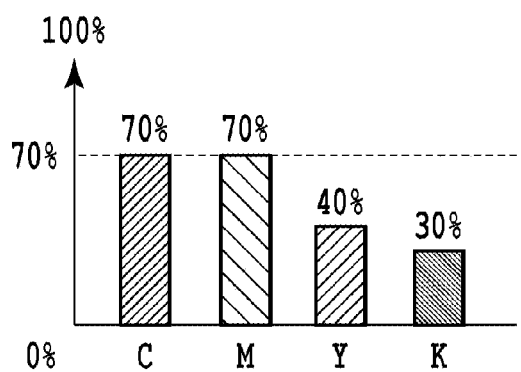

Hereinafter, advantageous effects of toner amount control according to the technique of the present embodiment will be described with reference to FIG. 8. FIG. 8 illustrates, for the image B (FIG. 1), the difference between the toner amount for each of the CMYK colors in the case of controlling the toner amount with a technique of the related art, and the toner amount for each of the CMYK colors in the case of controlling the toner amount with the technique of the present embodiment. Also, as discussed earlier, the toner amount for each of the CMYK colors in the image B is (C, M, Y, K)=(70%, 70%, 40%, 30%), and the total toner amount is 210%.

In the technique of the related art, toner amount reduction processes such as a UCR process and a CMY uniform reduction process are performed on the input color component values for each of the CMYK colors. As a result, for example, the toner amount for each of the CMYK colors is decided to be (C, M, Y, K)=(65%, 65%, 35%, 35%), and the total toner amount is adjusted from 210% to 200%, which is less than or equal to the limiting value.

On the other hand, in the technique of the present embodiment, before toner amount reduction processes such as a UCR process and a CMY uniform reduction process are performed on the input color component values for each of the CMYK colors, a limiting value is set based on the color component values for each of the CMYK colors (S601). In the present embodiment, the number of colors having a color component value greater than the color-specific threshold value (70%) for each of the CMYK colors becomes 0, and this number of colors is less than the color count threshold value (2). As a result, a limiting value (210%) is set, and the toner amount for each of the CMYK colors is adjusted to (C, M, Y, K)=(70%, 70%, 40%, 30%), without performing toner amount reduction processes such as a UCR process and a CMY uniform reduction process.

Figure 9:
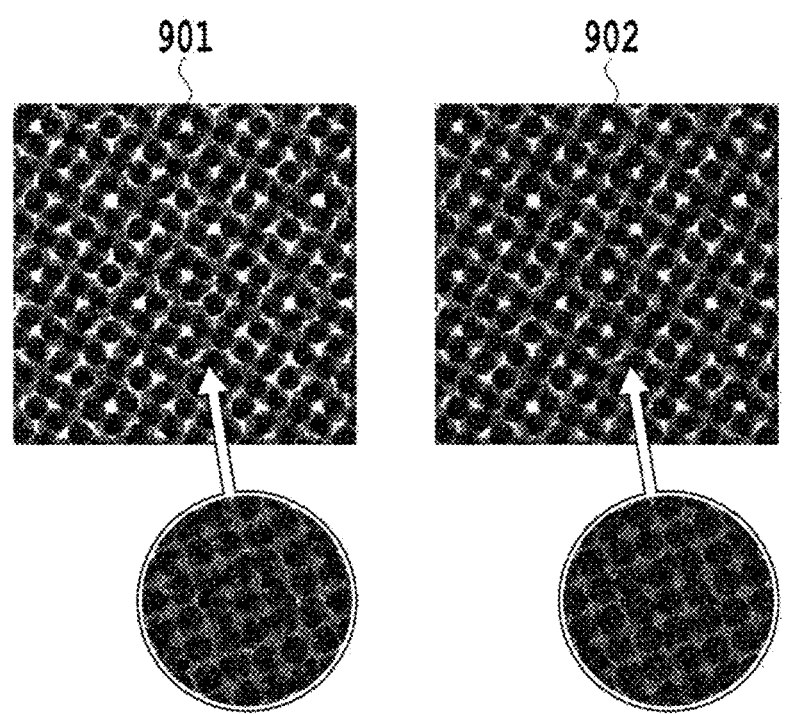
FIG. 9 is a diagram illustrating advantageous effects of toner amount control according to Embodiment 1.

FIG. 9 illustrates an example of an output image to which toner amount control according to a technique of the related art has been applied, and an example of an output image to which toner amount control of the present embodiment has been applied. Additionally, the callouts are respectively enlarged views of a part of each output image.

The image 901 corresponds to the image data in which the toner amount for each of the CMYK colors was adjusted to (C, M, Y, K)=(65%, 65%, 35%, 35%) for a total toner amount of 200% in FIG. 8. On the other hand, the image 902 corresponds to the image data in which the toner amount for each of the CMYK colors was adjusted to (C, M, Y, K)=(70%, 70%, 40%, 30%) for a total toner amount of 210% in FIG. 8.

As illustrated in FIG. 9, in the image 901, since even toner amount that does not need to be reduced is still reduced, the area over which toner is deposited and the area in which the dots for each of the CMYK colors overlap are small compared to the image 902. In contrast, in the image 902, the area over which toner is deposited and the area in which the dots for each of the CMYK colors overlap are large compared to the image 901. As a result, the toner amount for each of the CMYK colors is greater and deeper hues are expressed in the image 902 compared to the image 901.

As described above, according to the present embodiment, more toner may be used and images with richer hues may be formed while still remaining within a range that does not produce toner fixing failure.

Embodiment 2

Next, Embodiment 2 of the present invention will be described with reference to FIG. 10. Note that the description will be simplified or omitted for portions shared in common with Embodiment 1, and the following primarily will describe the points characteristic of the present embodiment.

Figure 10:
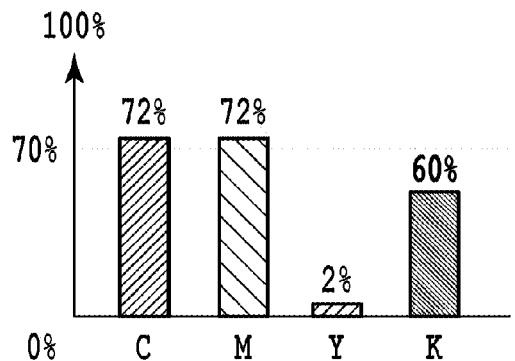
FIG. 10 is a diagram illustrating advantageous effects of toner amount control according to Embodiment 2.
Figure 10:
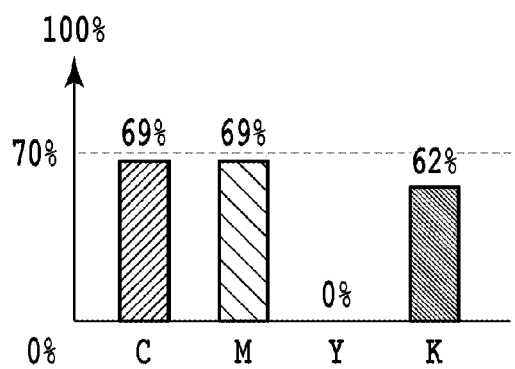
Figure 10:
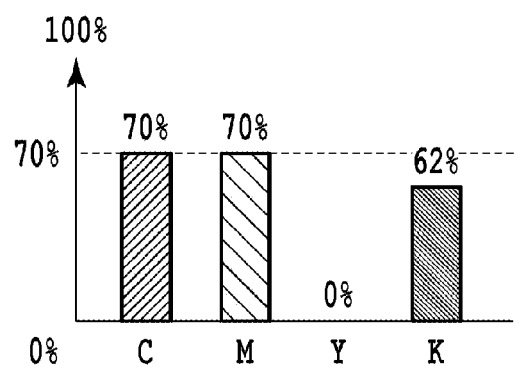

Similarly to FIG. 8, FIG. 10 illustrates the difference between the toner amount for each of the CMYK colors in the case of controlling the toner amount with a technique of the related art, and the toner amount for each of the CMYK colors in the case of controlling the toner amount with the technique of the present embodiment. In the present embodiment, the toner amount for each of the CMYK colors is (C, M, Y, K)=(72%, 72%, 2%, 60%), and the total toner amount is 206%.

In the technique of the related art, toner amount reduction processes such as a UCR process and a CMY uniform reduction process are performed on the input color component values for each of the CMYK colors. As a result, the toner amount for each of the CMYK colors is adjusted to (C, M, Y, K)=(69%, 69%, 0%, 62%) for a total toner amount of 200%, for example.

In the present embodiment, the number of colors having a color component value greater than the color-specific threshold value (70%) for each of the CMYK colors becomes 2, and this number of colors is equal to or greater than the color count threshold value (2). Consequently, the limiting value is set to 200%. Subsequently, a UCR process (S604 to S606) is performed on the input color component values for each of the CMYK colors. As a result, the toner amount for each of the CMYK colors is adjusted to (C, M, Y, K)=(70%, 70%, 0%, 62%) for a total toner amount of 202%, for example.

Subsequently, the limiting value is re-set based on the color component values for each of the CMYK colors (S607). This time, the number of colors having a color component value greater than the color-specific threshold value (70%) for each of the CMYK colors becomes 0, and this number of colors is less than the color count threshold value (2). Consequently, a larger limiting value (210%) than the limiting value (200%) is set. Since the total toner amount after the UCR process is 202%, which is less than or equal to the re-set limiting value (210%), the CMY uniform reduction process is not performed.

As described above, according to the present embodiment, in addition to the advantageous effects according to Embodiment 1, more accurate toner amount control may also be conducted.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an image forming apparatus according to the present invention, more toner may be used and images with richer hues may be formed while still remaining within a range that does not produce toner fixing failure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-200526 filed Oct. 8, 2015, which is hereby incorporated by reference wherein in its entirety.

What is claimed is:

1. An electrophotographic image forming apparatus that forms an image onto a print medium based on input image data, comprising:
   a setting unit configured to set, based on component values of a plurality of colors acquired for each pixel of the image data, a limiting value on a toner amount to use in the image formation for each pixel; and
   an image forming unit configured to form an image onto the print medium with an amount of toner less than or equal to the limiting value set by the setting unit,
   wherein the setting unit sets the limiting value based on the number of colors having the component value greater than a threshold value decided in consideration of toner fixing failure among the acquired component values of the plurality of colors.

2. The image forming apparatus according to claim 1, wherein
   the setting unit sets the limiting value indicating a larger value as the number of colors decreases.

3. The image forming apparatus according to claim 1, wherein the setting unit
   sets a first limiting value if the number of colors is equal to or greater than a predetermined number, and
   sets a second limiting value greater than the first limiting value if the number of colors is less than the predetermined number.

4. The image forming apparatus according to claim 3, wherein
   the setting unit changes, based on the component values of the plurality of colors acquired for each pixel of the image data, the limiting value on the toner amount to use in the image formation for each pixel from the predetermined first limiting value to the second limiting value greater than the first limiting value.

5. The image forming apparatus according to claim 3, wherein
   the threshold value includes the first threshold value decided in consideration of toner fixing failure, and a second threshold value less than the first threshold value, and
   the setting unit
      sets the first limiting value if the number of colors having the component value greater than the first threshold value is equal to or greater than the predetermined number,
      sets the second limiting value greater than the first limiting value if the number of colors having the component value less than or equal to the first threshold value and greater than the second threshold value is equal to or greater than the predetermined number, and
      sets a third limiting value greater than the second limiting value if the number of colors having the component value less than or equal to the second threshold value is equal to or greater than the predetermined number.

6. The image forming apparatus according to claim 1, wherein the threshold value is the same value for each of the plurality of colors.

7. The image forming apparatus according to claim 1, wherein the threshold value is a different value for at least some of the plurality of colors.

8. The image forming apparatus according to claim 1, further comprising:
   an adjustment unit configured to adjust the toner amount to use in the image formation if the toner amount to use in the image formation is greater than the limiting value,
   wherein the setting unit re-sets the limiting value on the toner amount to use in the image formation for each pixel, based on the component values of the plurality of colors corresponding to the toner amount adjusted by the adjustment unit.

9. A control method for controlling an electrophotographic image forming apparatus that forms an image onto a print medium based on input image data, the control method comprising the steps of:
   setting, based on component values of a plurality of colors acquired for each pixel of the image data, a limiting value on a toner amount to use in the image formation for each pixel; and
   forming an image onto the print medium with an amount of toner less than or equal to the set limiting value,
   wherein in said setting of the limiting value, the limiting value is set based on the number of colors having the component value greater than a threshold value decided in consideration of toner fixing failure among the acquired component values of the plurality of colors.

10. A non-transitory computer-readable storage medium storing a program for causing a computer to function as an electrophotographic image forming apparatus that forms an image onto a print medium based on input image data, the electrophotographic image forming apparatus comprising:

a setting unit configured to set, based on component values of a plurality of colors acquired for each pixel of the image data, a limiting value on a toner amount to use in the image formation for each pixel; and an image forming unit configured to form an image onto the print medium with an amount of toner less than or equal to the limiting value set by the setting unit, wherein the setting unit sets the limiting value based on the number of colors having a component value greater than a threshold value decided in consideration of toner fixing failure among the acquired component values of the plurality of colors.

11. An image processing apparatus comprising:

a setting unit configured to set, based on component values of a plurality of colors in a pixel of image data, a limiting value on the component values of the plurality of colors in the pixel; and a processing unit configured to decrease the component value of at least one color in the pixel so that a sum of the component values of the plurality of colors in the pixel becomes less than or equal to the limiting value set by the setting unit, wherein the setting unit sets the limiting value based on the number of colors having a component value greater than a threshold value among component values of a plurality of colors in a pixel of the image data.

12. The image processing apparatus according to claim 11, wherein the setting unit sets a first limiting value if the number of colors is equal to or greater than a predetermined number, and sets a second limiting value greater than the first limiting value if the number of colors is less than the predetermined number.

13. The image processing apparatus according to claim 11, wherein the setting unit sets a limiting value greater than a predetermined limiting value, based on the component values of the plurality of colors in the pixel.

14. An image processing method comprising the steps of:

setting, based on component values of a plurality of colors in a pixel of image data, a limiting value on the component values of the plurality of colors in the pixel; and decreasing the component value of at least one color in the pixel so that a sum of the component values of the plurality of colors in the pixel becomes less than or equal to the set limiting value, wherein in said setting of the limiting value, the limiting value is set based on the number of colors having a component value greater than a threshold value among component values of a plurality of colors in a pixel of the image data.

15. An image processing apparatus comprising:

a setting unit configured to set, based on component values of a plurality of colors in a pixel of image data, a limiting value on the component values of the plurality of colors in the pixel; and a processing unit configured to decrease the component value of at least one color in the pixel so that a sum of the component values of the plurality of colors in the pixel becomes less than or equal to the limiting value set by the setting unit, wherein the setting unit sets the limiting value based on whether there is or is not at least one color having a component value greater than a threshold value among component values of the plurality of colors in the pixel of the image data.

16. The image processing apparatus according to claim 15, wherein the setting unit decreases the limiting value of the pixel in a case where there is at least one color having the component value greater than the threshold value compared with a case where there is no color having as the component value greater than the threshold value.

17. An image processing method comprising the steps of:

setting, based on component values of a plurality of colors in a pixel of image data, a limiting value on the component values of the plurality of colors in the pixel; and decreasing the component value of at least one color in the pixel so that a sum of the component values of the plurality of colors in the pixel becomes less than or equal to the limiting value, wherein in said setting of the limiting value, the limiting value is set based on whether there is or is not at least one color having a component value greater than a threshold value among the component values of the plurality of colors in the pixel of the image data.

* * * * *